(12) United States Patent
Merritt et al.

(10) Patent No.: US 10,017,275 B2
(45) Date of Patent: Jul. 10, 2018

(54) CROSS BRACKET FOR AIRCRAFT CABIN AIR SUPPLY SYSTEM

(71) Applicant: Hamilton Sundstrand Corporation, Windsor Locks, CT (US)

(72) Inventors: Brent J. Merritt, Southwick, MA (US); Calvin R. Parent, Enfield, CT (US); Alpesh Patel, Weatogue, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 243 days.

(21) Appl. No.: 14/705,262

(22) Filed: May 6, 2015

(65) Prior Publication Data

US 2016/0327203 A1     Nov. 10, 2016

(51) Int. Cl.
*B60H 1/32* (2006.01)
*B64F 5/00* (2017.01)
*B64D 13/00* (2006.01)
*B64D 13/06* (2006.01)

(52) U.S. Cl.
CPC ............ *B64F 5/0081* (2013.01); *B64D 13/00* (2013.01); *B64D 2013/0644* (2013.01); *Y02T 50/56* (2013.01)

(58) Field of Classification Search
CPC ........ B64D 41/00; B64D 13/02; B64D 13/00; B64D 2013/0644; F16M 9/00; F16M 3/00; F16M 3/02; B64F 5/0081; Y02T 50/56; Y02T 29/49826
See application file for complete search history.

(56) References Cited

U.S. PATENT DOCUMENTS

| | | | |
|---|---|---|---|
| 5,553,892 A | 9/1996 | Pitchford et al. | |
| 5,954,309 A | 9/1999 | Kato et al. | |
| 6,139,211 A | 10/2000 | Schroeder et al. | |
| 6,263,954 B1 | 7/2001 | Nakayama | |
| 6,270,051 B1 | 8/2001 | Power | |
| 7,516,621 B2 | 4/2009 | Suttie et al. | |
| 7,637,521 B2 | 12/2009 | Grant | |
| 8,104,736 B2 | 1/2012 | Callaghan | |
| 8,167,540 B2 | 5/2012 | Schlinker | |
| 8,172,512 B2 | 5/2012 | Short et al. | |
| 8,955,809 B2 | 2/2015 | Vignali et al. | |
| 2014/0346302 A1* | 11/2014 | Vignali | B64D 13/02 248/309.1 |

* cited by examiner

*Primary Examiner* — Elizabeth Martin
(74) *Attorney, Agent, or Firm* — Carlson, Gaskey & Olds, P.C.

(57) ABSTRACT

A compressor cross bracket for use in an air supply system for an aircraft comprises a ledge extending away from a main body. The main body has ends at opposed sides and a ditch defined between the ends. Each of the ends have at least one bolt hole which has a diameter. A thickness of the ledge is defined in a direction from which the main body extends from the ledge, with a ratio of the thickness to the diameter being between 0.636 and 0.680. A cabin air supply system and a method of servicing a cabin air supply system are also disclosed.

1 Claim, 7 Drawing Sheets

CROSS BRACKET FOR AIRCRAFT CABIN AIR SUPPLY SYSTEM

BACKGROUND OF THE INVENTION

This application relates to a mount bracket which connects components of an aircraft cabin air supply system.

Aircraft are typically provided with an air supply system which conditions and supplies air for use as cabin air. The systems typically provide an air cycle machine which includes a compressor and turbines that are utilized to condition air being supplied to the aircraft cabin. The air is supplied to the air cycle machine from cabin air compressors.

There are ducts and any number of flow manifolds as part of the cabin air supply system.

In the prior art, a plurality of mount brackets mount the entire system to an aircraft frame. One mount area includes compressor mount brackets for being mounted to cabin air compressors. The compressor mount brackets are secured to a three-way mount that is secured to an aircraft frame.

There are concerns with regard to the strength provided by the prior art mount bracket, and the stresses it encounters.

SUMMARY OF THE INVENTION

A compressor cross bracket for use in an air supply system for an aircraft comprises a ledge extending away from a main body. The main body has ends at opposed sides and a ditch defined between the ends. Each of the ends have at least one bolt hole which has a diameter. A thickness of the ledge is defined in a direction from which the main body extends from the ledge, with a ratio of the thickness to the diameter being between 0.636 and 0.680. A cabin air supply system and a method of servicing a cabin air supply system are also disclosed.

These and other features may be best understood from the following specification and drawings, the following which is a brief description.

DETAILED DESCRIPTION

Figure 1:
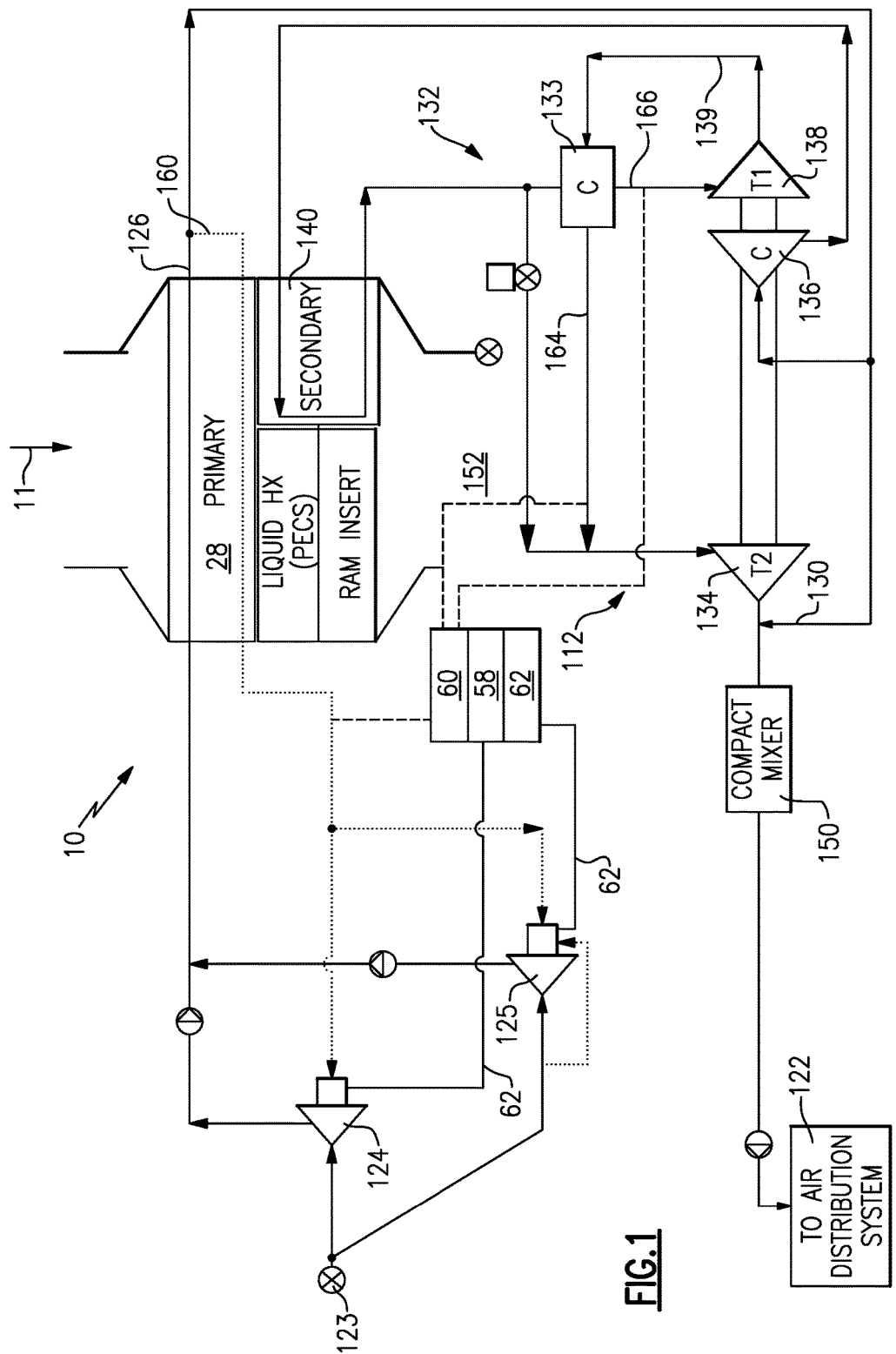
FIG. 1 schematically shows a cabin air supply system.

FIG. 1 shows cabin air supply system 10 which may be incorporated into an aircraft. A source 123 of air delivers air into a pair of cabin air supply compressors 124 and 125. The compressors 124/125 pass the air through a primary heat exchanger 28, which receives a flow of ambient air from outside of the aircraft shown schematically at 11. The air passing through the primary heat exchanger 28 moves to a supply conduit 126, and some of the air is delivered to a line 130, and then to a compact mixer 150, and to an air distribution system 122 for the aircraft. Another portion of the air is delivered to a compressor 136, and from the compressor 136 back through a secondary heat exchanger 140. Downstream of the heat exchanger 140, the air may pass to a condenser 133. The air from heat exchanger 140 passes through the condenser 133 and may drive a turbine 138, and the air downstream of the turbine 138 is returned to the condenser 133 through passage 139. The two airflow passages are maintained separate in condenser 133. Downstream of the condenser 133, the air from line 139 may pass into a line 164, leading to a second turbine 134, and then to the mixer 150. Turbines 134, 138, and compressor 136, are all part of an air cycle machine 132.

A tap 160 taps bearing cooling air for the compressors 124 and 125, as shown schematically. A mount bracket 62/58 is shown schematically in FIG. 1. A manifold 60 distributes air from the lines 160, 164 and 166, all of which are shown schematically by dashed lines. In general, the manifold 60 would carry a tube that would provide a portion of the lines 160, 164 and 166.

Figure 2A:
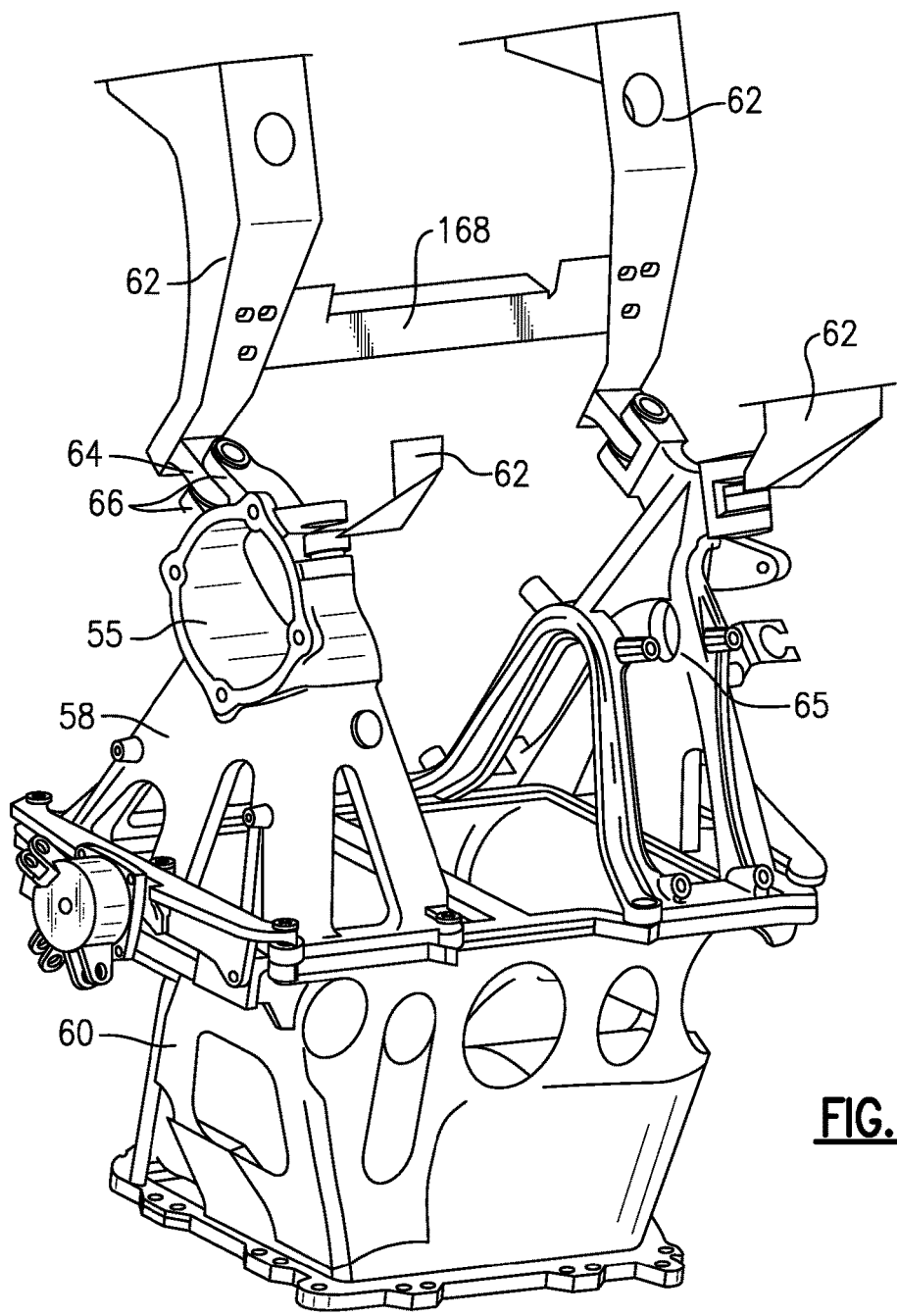
FIG. 2A is a perspective view of a detail of a mount bracket.

FIG. 2A shows compressor mount brackets 62 which connect the cabin air compressors 124 and 125 to mount brackets 58 and 65. When the system is mounted in an aircraft, the bracket 58 will be vertically above the bracket 65. Bracket 58 is known as a three-way mount bracket. As shown, the cabin air compressor brackets 62 are secured through a flange 64 to ears 66 on the mount bracket 58. A central hole 55 is connected to an aircraft frame through a vibration dampening member. A cross bracket 168 connects a pair of compressor mount brackets.

The compressor mount brackets 62 are shown as mirror image parts and are bolted at 19 to cross bracket 18.

The forward manifold 60 communicates with ducts to supply air. In particular, portions of passages 160, 164 and 166 (not shown) pass through the forward manifold 60.

Figure 2B:
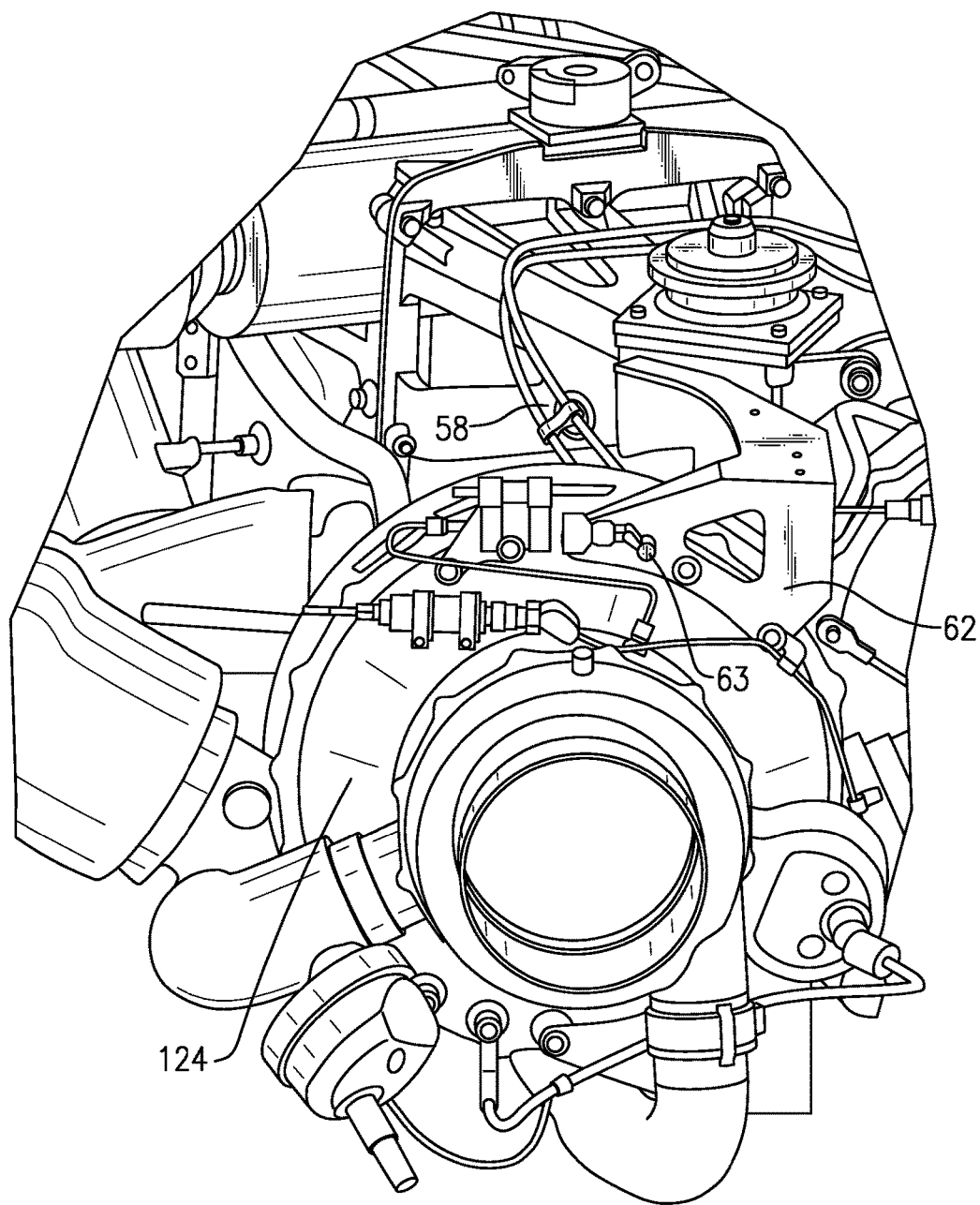
FIG. 2B shows a mount location.

FIG. 2B shows amount bracket 62 receiving bolts 63 to secure the bracket 62 to a compressor 124. The three-way mount 58 is also illustrated.

Figure 2C:
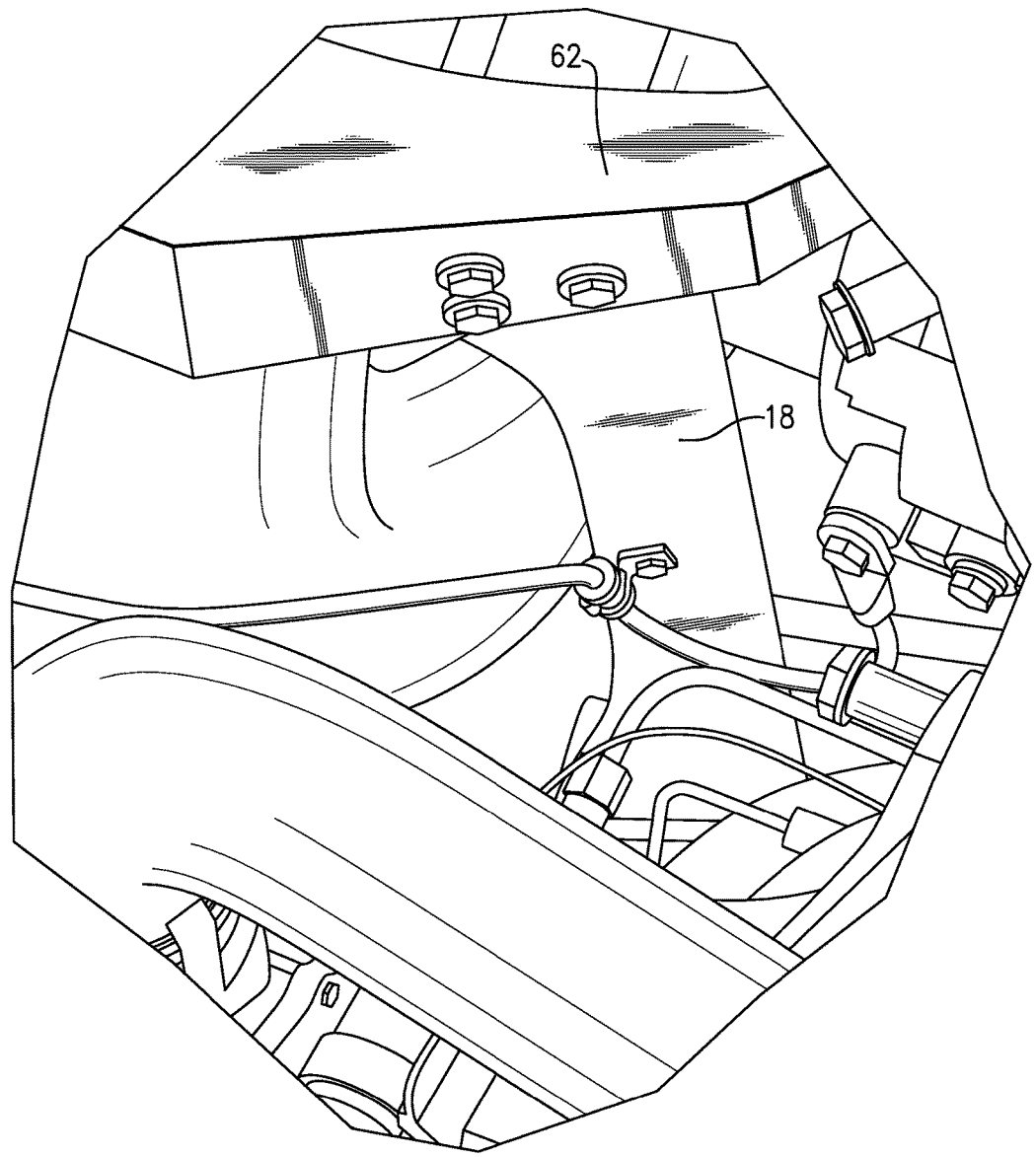
FIG. 2C shows the location of a cross bracket.

FIG. 2C shows a cross bracket 168 connecting two mount brackets 62. In this view, the three-way mount bracket 58 has been removed such that the cross bracket 168 can be seen.

Figure 3:
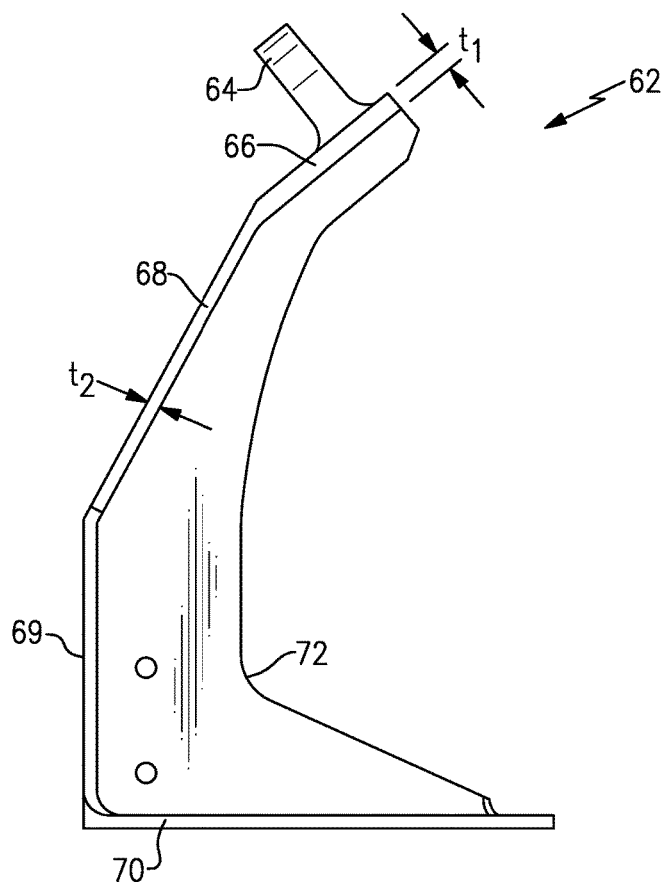
FIG. 3 is a side view of the compressor mount bracket.

FIG. 3 is a side view of a bracket 62. As shown, the flange 64 extends from a mount location 66 which has a thickness $t_1$. The mount location 66 merges into an angled side 68, which in turn merges into a square side 69. Square side 69 extends to a mount floor 70. A closure side 72 extends from floor 70 along sides 66, 68 and 69. The square side 69 is at a right angle relative to the mount floor 70. The angled side 68 is non-parallel to the square side 69, and extends from the square side 69 back over the mount floor 70. The mount location 66 is at a non-parallel angle relative to the angled side 68, and extends further over the mount floor 70. The thickness at the extending angled side 68 is $t_2$.

Figure 4:
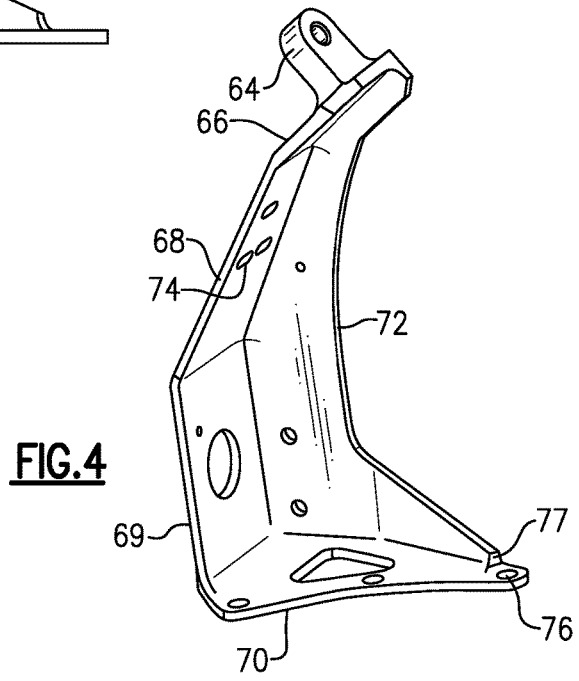
FIG. 4 is a perspective view of the compressor mount bracket.

As shown in FIG. 4, bolt holes 74 are formed in the angled side 66, and will receive bolts to connect to the cross bracket 18. The floor 70 has a bolt hole 76 which receives the bolt 63 to attach the bracket to the compressor, as illustrated in FIG. 2B.

The closure side 72 has a forward end 77 which ends closer to square side 69 than is hole 76. Further, square side 69 extends in a first direction away from the floor 70, and the square side extends from the mount floor in the same first direction. As can be seen, closure side 72 has a multi-sided outer surface, defined facing away from the square side 69.

Figure 5:
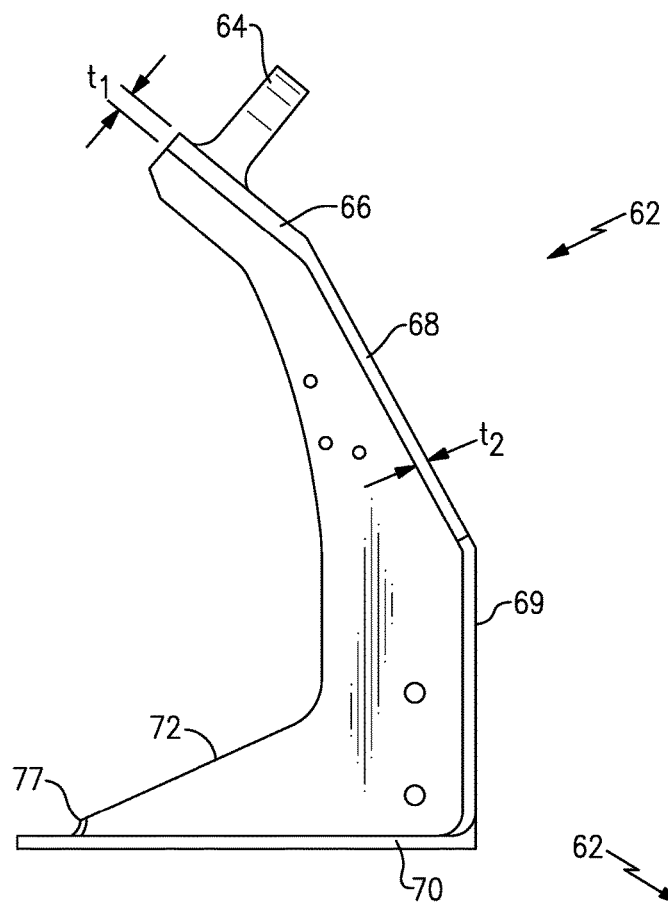
FIG. 5 shows another compressor mount bracket which is the minor image of the FIG. 3/4 mount bracket.
Figure 6:
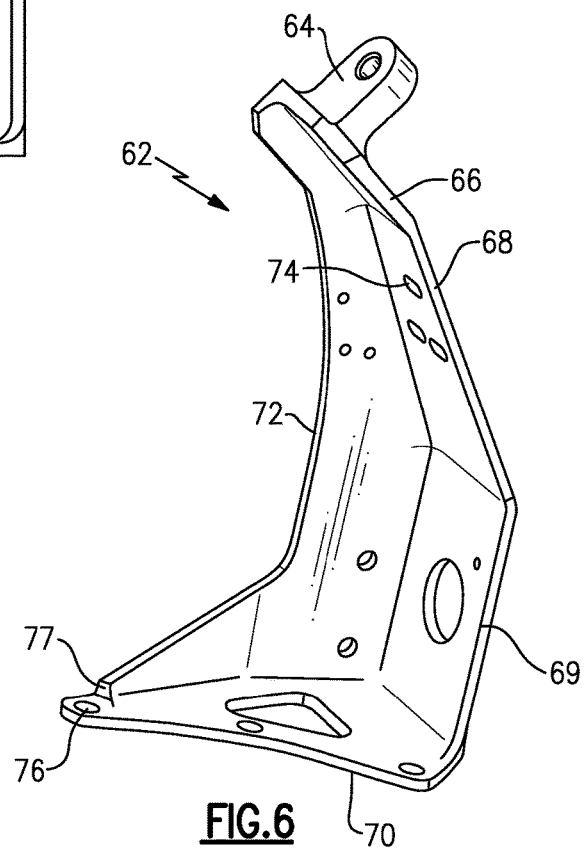
FIG. 6 shows another compressor mount bracket which is the minor image of the FIG. 3/4 mount bracket.

FIGS. 5 and 6 show a minor image compressor mount bracket 62. As should be appreciated, the assembly shown in FIG. 2A includes one bracket as shown in FIGS. 3/4, and one bracket as shown in FIGS. 5/6.

The following dimensions apply to both brackets illustrated in FIGS. 3-6.

In one embodiment, a diameter of the hole 76 is formed to be 0.521 inch (1.32 cm). In the prior art, this bolt hole was 0.406 inch (1.03 cm).

The thickness $t_1$ is 0.375 inch (0.952 cm). In the prior art, the thickness $t_1$ was 0.250 inch (0.635 cm). The thickness $t_2$ was 0.250 inch (0.635 cm). In the prior art, the thickness $t_2$ was 0.250 inch (0.635 cm).

In embodiments, a ratio of $t_1$ to $t_2$ was between 1.38 and 1.63. In embodiments, a ratio of the diameter of the bolt hole in the mount floor to $t_1$ is between 1.34 and 1.44.

Figure 7:
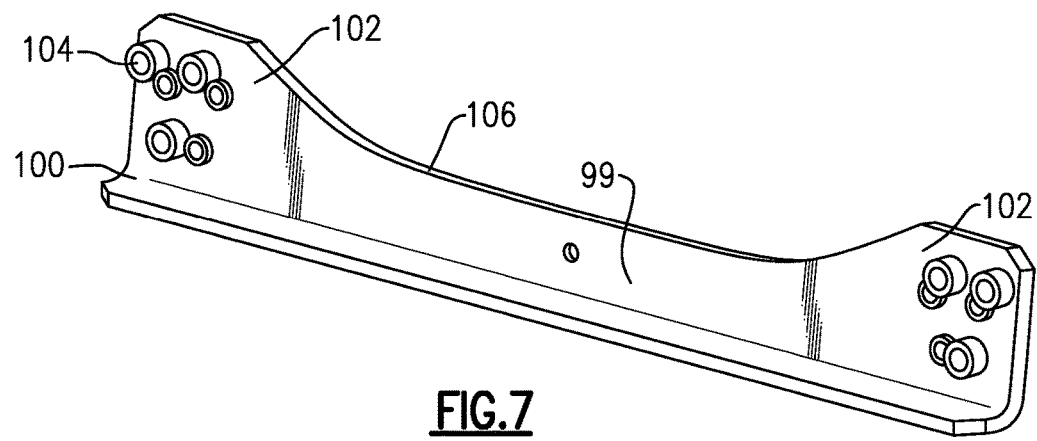
FIG. 7 illustrates a cross bracket.

The cross bracket 168 is illustrated in FIG. 7. As can be seen, there is an outwardly extend flange 100 extending from a main body 99. Main body 99 has ends 102. The ends 102 include bolt holes 104 which receive bolts to secure the cross bracket 168 to the compressor mount brackets. Further, a ditch 106 is formed between the ends 102, and extends for a lesser distance away from the flange 100 than do the ends 102.

Figure 8:
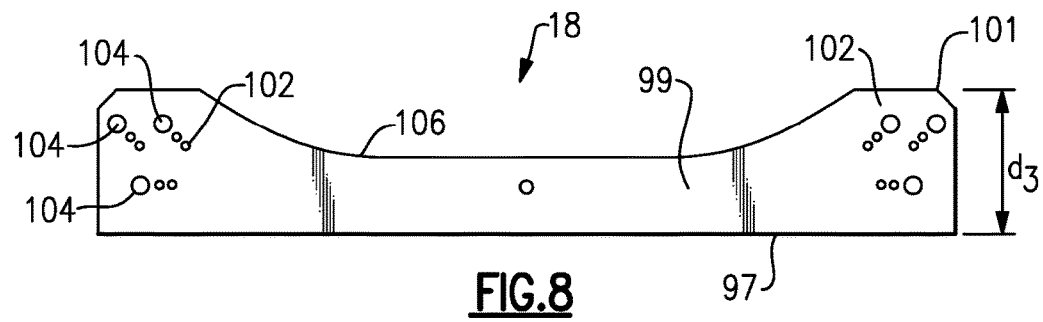
FIG. 8 is a front view of the FIG. 7 cross bracket.

FIG. 8 shows that there are three bolt holes 104 to receive bolts to secure the cross bracket 168 to the compressor mount brackets 106. A distance between a lower most surface 99 of the flange 100 and a top 101 of the end 102 is defined as $d_3$.

The bolt holes 104 have a diameter of 0.386 inches (0.980 cm). In the prior art, the diameter was 0.386 (0.980 cm).

Figure 9:
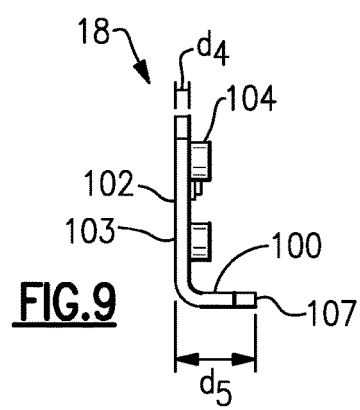
FIG. 9 is a side view of the cross bracket.

As shown in FIG. 9, the flange 100 has a thickness of $d_4$. A distance between a rear surface 103 at the end 102 to a forward end 107 of the flange is defined as $d_5$.

In embodiments, $d_3$ was 2.875 inches (7.302 cm). In the prior art, $d_3$ was 2.875. $d_4$ is 0.250 inch (7.302 cm) and in the prior art was 0.160 inch (0.406 cm). $d_5$ was 1.375 inch (3.492 and cm) and was 1.375 inch (3.492 cm) in the prior art.

From FIG. 9 it is clear that the bolt holes 104 have bosses that extend outwardly of a face at the end 102.

In embodiments, a ratio of $d_4$ to the diameter of the bolt holes 104 is between 0.636 and 0.680. A ratio of $d_4$ to $d_5$ is between 0.174 and 0.190, and a ratio of $d_4$ to $d_3$ is between 0.083 and 0.091.

The disclosure could be summarized as a compressor cross bracket 168 for use in an air supply system for an aircraft has a ledge 100 extending away from a main body 99. The main body has ends 102 at opposed sides and a ditch 106 defined between ends 102. Each of the ends has at least one bolt hole 104. The bolt holes has a diameter. There is a thickness of ledge 100 defined in a direction from which main body 99 extends from ledge 100. A ratio of the thickness to the diameter is between 0.636 and 0.680.

A rear surface of the main body 99 is defined on an opposed surface from the ledge 100. A first distance is defined from the opposed surface 102 to an end 107 of the ledge 100. A ratio of the thickness to the first distance is between 0.219 and 0.234.

A second distance is defined from a bottom of the ledge to a furthestmost end 101. A ratio of the thickness to the second distance is between 0.077 and 0.080.

The bolt holes also extend through the angled side and receive bolts to secure the replacement mount bracket to one of the cabin air supply compressors.

In a method of servicing a cabin air supply system where an air cycle machine 10 has a condenser 133, and two outlet lines from the condenser. A pair of cabin air supply compressors 124/125 are mounted by compressor mount brackets 62 to a three-way mount bracket 58. The three-way mount bracket 58 further mounts a forward manifold 60. A cross bracket 168 has two ends 102, with one end 102 connected to each of the compressor mount brackets 62. The forward manifold 60 provides a portion of a flow line for each of the outlets of the condenser, and further receiving a portion of a flow line supplying bearing cooling air tapped from a line downstream of the pair of cabin air supply compressors 124/125 back to bearings of the cabin air supply compressors, and downstream of a heat exchanger. The method includes the steps of removing the cross bracket, and replacing the cross bracket with a replacement cross bracket by mounting it to the compressor mount brackets.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A compressor cross bracket for use in an air supply system for an aircraft comprising:
   a ledge extending away from a main body, said main body having ends at opposed sides and a ditch defined between said ends, with each of said ends having at least one bolt hole, and said at least one bolt hole having a diameter, and there being a thickness of said ledge defined in a direction from which said main body extends from said ledge, with a ratio of said thickness to said diameter being between 0.636 and 0.680;
   wherein a rear surface of said main body is defined on an opposed surface from said ledge, and a first distance is defined from said opposed surface to an end of said ledge, and a ratio of said thickness surface to said first distance being between 0.219 and 0.234; and
   wherein a second distance is defined from a bottom of said ledge to a furthestmost portion of said end, and a ratio of said thickness to said second distance is between 0.077 and 0.080.

* * * * *